Figure 1:
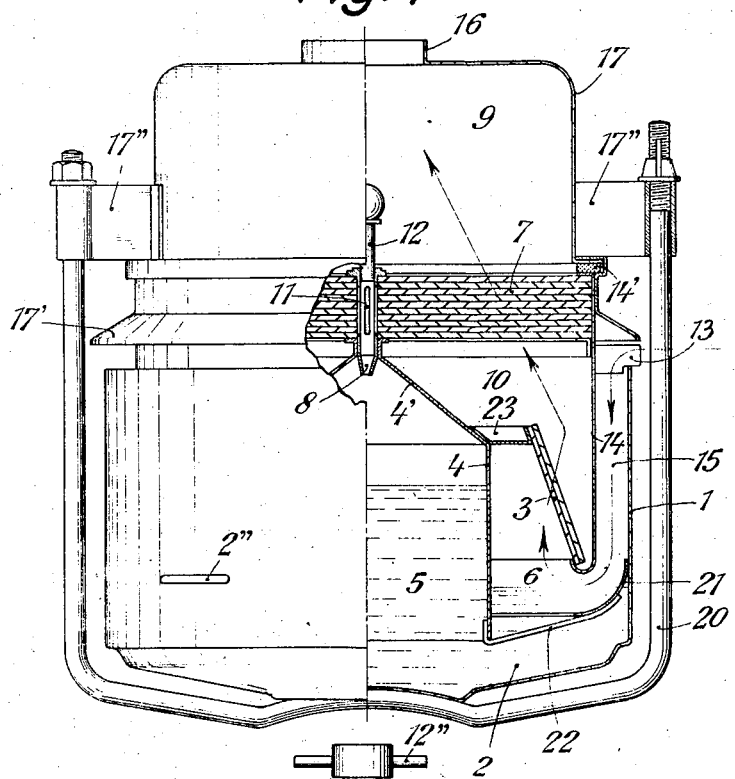
Figure 1A:
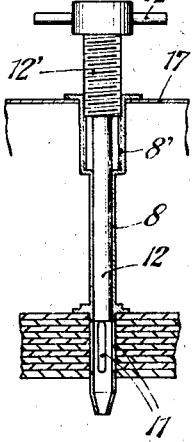

April 22, 1941.   W. NEUMANN   2,239,620
MEANS FOR FILTERING OR PURIFYING FLUID
Filed March 9, 1938

Inventor:
W. Neumann
By John A. Seifert
Attorney

Patented Apr. 22, 1941

2,239,620

UNITED STATES PATENT OFFICE 2,239,620

MEANS FOR FILTERING OR PURIFYING FLUID

Willy Neumann, Siedling, Ladeburg, near Bernau, Germany

Application March 9, 1938, Serial No. 194,726
In Poland October 11, 1937

3 Claims. (Cl. 183—15)

This invention relates to filters or cleaners for air or other gases wherein the air or gas to be filtered is first subjected to the action of a liquid, such as oil, to separate dust and other foreign substances therefrom and then passed through filtering means to separate entrained liquid and foreign substances therefrom.

Air or gas filters of this character include a cup shaped member to contain the liquid, such as oil, and a filtering element is carried by an annular member of less diameter than the cup. member, the filtering element being extended into the cup member and terminating above the level of the liquid therein. The space between the filter carrying member and side wall of the cup member forms an inlet passage for the air or gas to be filtered into the filter. The air or gas flowing through said passage impinges upon the surface of the liquid thereby separating dust and other foreign substances therefrom and is then passed through the filtering element separating the foreign substances from the air or gas which collects upon the filtering element clogging and choking the same. It is contemplated that foreign substances collecting upon the filtering element will be flushed therefrom by the splashing of the liquid caused by the air impinging against the liquid in its passage into the filter. However, the splashing of a sufficient quantity of liquid onto the filtering element to flush foreign substances therefrom can only be effected when the level of the liquid in the cup member is so close to the filtering element as to nearly contact therewith. In practice it is impossible to maintain the liquid at such level since should the air be impinged upon the liquid at a high velocity there will be such an agitation of the liquid as to cause an excess quantity of the liquid to be splashed onto the filtering element and a consequent entrainment of the liquid with the air or gas through the filtering element and conveyed to the place of use of the filtered air or gas. Should the velocity of the air be reduced sufficiently to prevent excessive splashing of liquid onto the filtering element, then the air passages and the filtering element must be proportioned relative to the velocity of the air. This requires frequent and accurate adjustment of the filter, which is not desirable in the commercial use of the filter, and the necessity of adjustment of the filter must be reduced to a minimum. In order that a filter of this character will operate the space between the level of the liquid and the filtering element must be such as to permit of the flow of a volume of air that will effect only the splashing of a sufficient quantity of the liquid onto the filtering element as will flush off foreign substances from and moisten or wet the filtering element. If the velocity of the air stream is constant it is possible to correctly space the level of the liquid from the filtering element. However, when there are fluctuations in the velocity of the air stream, as is the case with the use of the filter with internal combustion engines for which it is particularly adapted, the quantity of liquid in the filter is such that the level of the liquid will be spaced from the filtering element for the flow of the greatest volume of air without effecting any excessive splashing of the liquid onto the filtering element. In this case should there be a reduction in the velocity and volume of air flowing through the filter there is a corresponding reduction in the agitation of the liquid with the result that there will not be sufficient liquid splashed onto the filtering element to flush foreign substances therefrom and the filtering element becomes clogged and choked and ceases to function.

It is the principal object of the invention to provide an improved filter of this character wherein substantially an entire surface of a filtering element is exposed to the surface of the liquid in the filter and the quantity of liquid is sufficient to shut off communication between the air inlet to the filter and the filtering element in the inoperative condition of the filter, and the provision of means operative by a reduction of pressure in the filter to lower and space the level of the liquid below the filtering element to open communication between the air inlet and the filtering element, and operative to vary the lowering and spacing of the liquid level from the filtering element proportional to the reduction of the pressure in the filter and velocity of the air to effect agitation of the liquid by the air entering the filter and impinging on the liquid to splash liquid onto the filtering element only sufficient to flush therefrom foreign substances separated from the air and accumulated on the filtering element and to moisten the same.

A further object of the invention relates to an improved filter for air or other gases of this character including a liquid carrying cup shaped member arranged with means to provide a pair of concentric chambers therein opening at the bottom to the liquid in said member and one of which chambers is maintained out of communication at the bottom from the other chamber by the liquid and out of communication with said member above the level of the liquid therein, and provide an air inlet passage leading to the bottom of said member and maintained out of communication with the filter by the liquid in the inoperative condition of the filter, and said inlet passage adapted to be opened to the outer chamber by a lowering and spacing of the liquid level below the outer chamber by reduction in pressure in the chamber and varying said lowering of the liquid level by and in accordance with variations in the reduction of pressure in the inner chamber and a consequent variation in the velocity of flow of air into the filter whereby the air as it enters through said inlet passage impinges upon the surface of the liquid and splashes the liquid onto the filtering element in quantity only sufficient to flush and wet the same.

It is another object of the invention to provide in filters for air or other gases of this character a second filtering element to effect a final filtering of the air after it has passed through a primary filtering element and separate entrained liquid from the air and arranging the outer chamber with a compartment rearwardly of the primary filtering element.

In carrying out the invention there is provided a cup shaped member or casing carrying liquid, such as oil, and a hood superposed to the open end of and secured to the casing. The casing is arranged with means forming two concentric chambers therein and an inlet passage for the air or other gas to be filtered and cleaned into the filter at the outer side of the outer chamber and leading downwardly to adjacent the bottom of the casing. The inner chamber is out of communication with the casing above the level of the liquid and has a restricted outlet from above the level of the liquid in communication with the hood and open at the bottom to the casing below the level of the liquid and at all times maintained out of communication with the outer chamber and air inlet passage by the liquid. The outer chamber and inlet passage open at the bottom to the casing below the level of the liquid and are maintained out of communication with each other by the liquid in the inoperative condition of the filter. A primary filtering element is arranged in and bridges the lower portion of the outer chamber with an entire surface thereof exposed to the surface of the liquid, and a secondary filtering element separates the casing from the hood and forms a casing rearwardly from the primary filtering element separated from the hood chamber by said filtering element. The restricted outlet from the inner chamber above the liquid in the casing is directly or regulatably connected in communication with the hood chamber through said secondary filtering element. Air or other gas to be filtered is caused to flow into the inlet passage and through the filtering elements by a reduction of pressure in the chambers above the liquid level in the casing induced by means, such as suction or vacuum creating means connected to the hood, and effecting a greater reduction of pressure within the inner chamber above the liquid in the casing, thereby raising the level of the liquid in said inner chamber and lowering the level of the liquid below and open communication between the inlet passage and outer chamber, the lowering and spacing of the liquid level below the outer chamber and connection thereof with the inlet passage, and thereby the velocity of the flow of the air, are varied by and in accordance with variations in the pressure in the chambers. The air as it flows into the inlet passage impinges against the surface of the liquid agitating the same and causing foreign substances to be separated by the air in the liquid and also splashes the liquid onto the surface of the primary filtering element opposed to the liquid only in quantity sufficient to flush therefrom foreign substances separated from the air in its passage from the filter and adhering thereto. The air passing from the primary filtering chamber passes from the chamber at the rear thereof into the secondary filtering element which functions to separate from the air liquid with foreign substances that may be entrained with the liquid in its passage through the primary filtering element.

In the drawing accompanying and forming a part of this application

Figure 1 is a side elevation, partly in section, of an embodiment of an air or other gas filter for carrying out the invention.

Figure 1ª is a sectional detail view of modified means for regulating the connection of one chamber of the filter with pressure reducing means.

In the embodiment of filter for carrying out the invention shown in Figure 1 there is provided a housing 1 including a lower cup shaped casing or container 2 and a hood member 17 superposed thereto. The cup member or casing 2 is adapted to carry a predetermined quantity of suitable liquid, such as oil, for separating impurities, such as dust and other foreign substances, from air or other gases. The casing 2 is connected to and supported from the hood 17 in spaced relation to an outwardly flaring marginal portion 17' thereof to provide an annular space 13 in communication with the casing 2 by a substantially U-shape member 20 within which the casing is engaged with an arcuate portion midway the length of the leg connecting portion of the supporting member engaging a correspondingly formed inwardly extending recess in the casing wall, as at 2'. The ends of the supporting member 20 are screw threaded and slidably engage in openings in lugs 17" fixed to and extending laterally from the hood 17 with nuts threaded onto the threaded ends, which may be thumb nuts as shown at the right in Figure 1. An annular member 21 of arcuate form in cross section is fixed within the casing 2 adjacent the bottom with the concave side uppermost. A hollow cylindrical body or bell of less diameter than the cup member 4 is supported at the open end in inverted position in the cup member with the open end in communication with the cup member below the level of the liquid therein by brackets 22 fixed to and extending inwardly from the convex face of the annular member 21, the body 4 arranging the casing 2 with a chamber 5 open to the casing below the level of the liquid therein. The upper end of the body 4 is arranged of conical form, as at 4', and has an opening through the apex thereof. A primary filtering element 3 of annular conical form, although it may be of uniform diameter from end to end, and comprising, as shown, a pair of plates of foraminous material, such as expanded metal, is fixed at the upper end on an annular dished member 23 fixed and supported upon the conical wall 4' of the body 4 and at the lower end engaging in and connected to an inwardly curved end portion of a cylindrical member 14. The upper end of member 14 engages packing material in an annular recess extending laterally of the hood 17 and providing a substantially pressure tight seal, as at 14'. The cylindrical member 14 is of larger diameter than and with the bell 4 forms a second chamber 6 in the casing concentric of the chamber 5 and open at the bottom to the liquid in the casing at a higher level than body 4 and shut off from the casing by the liquid in the inoperative condition of the filter and out of communication with the chamber above the liquid. A secondary filtering element in the form of a cartridge 7 of suitable material, and which may comprise juxtaposed plates of foraminous material similar to the filtering element 3, is supported within the upper portion of the member 14 upon an annular ledge 24, said element forming a compartment 10 rearwardly of the filtering element and arranging the hood with a compartment 9 separated from the compartment 10 by the filtering element 7. The cylindrical member 14 is of less diameter than and defines with the side wall of the cup member 1 an annular passage 15 in communication with the inlet opening 13 and leading downwardly into the casing between the side wall of the casing and the member 14 normally shut off by the liquid from the chamber 6 at the front side of the filtering element 3 and through which air is conducted into the cleaner toward the surface of the liquid in the cup member. The outlet opening 16 from the hood is arranged with an outwardly extending flange to connect the filter to suitable pressure reducing means to induce a flow of air through the filter from the inlet 13 to the outlet 16. To produce a different and lower pressure in the chamber 5 than in the chamber 6 the chamber 5 may be connected directly to the pressure reducing means through the hood chamber 9 by a tube 8 extended through the filtering element 7 into the body 4 through the opening in the conical end 4'. To prevent entrainment of liquid with the air drawn from chamber 5 through the tube 8 the inlet end of the tube opening to the chamber 5 is restricted as by tapering the wall of the tube. Instead of restricting the inlet to the tube 8 to prevent entrainment of liquid with the air from the body chamber 5 and also separate any liquid from the air withdrawn from said chamber 5, said chamber is connected to the hood chamber 9 through the filtering element 7 and such connection regulated to vary the pressure in chamber 5. For this purpose the tube 8 is provided with longitudinal slots 11 and the length and size of the slots varied by a plug member 12 slidably engaging in the tube.

In Figure 1ᵃ there is shown a modified arrangement of the closure member 12 for varying the length and size of the tube slots 11. In this arrangement the opening 16 to the hood chamber 9 for connection of means for inducing a flow of air through the filter and produce different pressures in the chambers 5, 6 is in the side wall of the hood and the tube 8 is elongated and has an interiorly threaded tubular portion 8' of increased diameter extended through an opening in the hood. The closure plug 12 is also elongated and arranged with an externally threaded portion of increased diameter 12' adapted to have screw threaded connection with the portion 8', and the closure plug provided with a head and a pin extended through and projecting from the opposite sides exterior of the hood 17, as at 12'', to constitute finger engaging means to manipulate the closure plug.

In use a predetermined quantity of liquid, such as oil, is filled into the cup member or casing 2 to a level indicated by the sight opening 2'' and which level the liquid will assume in the inoperative condition of the filter with the open end of the bell 4 extended into the liquid and the liquid assuming the same level in the chamber 5 as in the chamber 6 of the casing or cup member 2 and shutting off communication between the inlet passage 15 and the chamber 6 in the inoperative condition of the filter. As pressure reducing means, such as suction or vacuum creating means, is connected to the hood opening 16 there is first effected a differential reduction of the pressures in chambers 5 and 6 with the lower pressure in the chamber 5 in the body 4 causing the liquid to be transferred or displaced from chamber 6 into chamber 5 and the level of the liquid to rise in said chamber 5 and the level of the liquid to lower in chamber 6, providing a space between the primary filter element 3 and the level of the liquid in chamber 6, the extent of the space depending upon the suction and reduction of the pressure in chamber 5. The reduction in pressure in chamber 5 causes air or other gas to flow or be drawn into the filtering apparatus or cleaner through the inlet 13 downwardly through the passage 15 and impinged against the surface of the liquid in chamber 6 and to flow in reverse direction through an arc of substantially 180 degrees about the lower end of the cylindrical member 14 and through the filter element 3, effecting a primary filtering of the air or gas, and into the chamber 10 from which it flows through the filtering element 7 to effect a secondary or final filtering of liquid and foreign substances from the air and into the hood chamber 9. As the air impinges against the surface of the liquid in chamber 6 it sets up a turbulent surging and agitation of the liquid in the chamber causing the liquid to splash and produce a spray that drizzles upon and over the primary filtering element 3 thereby flushing and washing from the filtering element foreign substances adhering thereto and moistening or wetting the same. By reversing the flow of the air the air is caused to contact with the liquid for a considerable length of its flow effecting separation of foreign substances from the air, such as dust and the like, which is taken up by the liquid, and the air absorbing the liquid. The air after contacting with the liquid passes through the primary filtering element 3 separating from the air particles of liquid and foreign substances that may have been entrained with the liquid. From the filtering element 3 the air passes into the chamber 10 and thence through the secondary filtering element or filter cartridge 7 effecting a final and fine filtering of the air and separation of moisture from the air passing therethrough into the hood chamber. The air passes from the hood chamber through the outlet 16 to the place of use of the air. Any moisture or liquid separated from the air in its passage through the filter cartridge 7 is collected in the dished member 23 from which it flows onto the filter element 3 and from the latter into the inwardly curved marginal portion of the cylindrical member 14 from which it overflows into the chamber 6. While the filter is adapted for use for various purposes where it is desired to separate dust and other foreign substances from air and other gases, it is particularly adapted for use for filtering air to be mixed with and constitute a part of the fuel for internal combustion engines. In the use of the filter for said purpose there is a variation in suction due to variations in the speed of the engine. The level of the liquid and spacing of the same from the filtering element 3 to vary the size of the passage for the incoming impure air is automatically regulated, increased or decreased in size, by and in accordance with variations in the suction and pressure in the chambers 5 and 6 and there is a conformable variation in the velocity of the flow of the air into and through the filter with the result that there is assurance at all times that the air will contact with the liquid in its passage to the chamber 6 and surging and agitation of the liquid to cause the liquid to spray onto and wash from the filtering element 3 foreign substances separated from the air and collected thereon as well as moistening or wetting said filtering element. It will be noted that the chamber 5 in the body 4 is at all times shut off from the chamber 6 by the liquid. By connecting the bell 4 above the liquid therein through the slotted tube 8 to the region in the cleaner in which the pressure becomes increasingly less relative to the pressure on the liquid in the cup member exterior of the bell as the rate of flow of air through the cleaner increases, and by varying the area of the tube slots by the adjustment of the plug 12 and thereby regulating the connection of the bell above the liquid therein with said region in the cleaner, the liquid in the bell may be caused to be subjected to different pressures predeterminedly higher than the pressures in said region and proportionally less than the pressure to which the liquid in the cup member exterior of the bell is subjected and raising the level of the liquid in the bell and lowering the level of the liquid in the cup member exterior of the bell proportional to the pressures to which the liquid in the bell is subjected.

Having described my invention, I claim:

1. In a cleaner for air and other gases, a cup like member constituting a liquid reservoir, a bell of less diameter than and in communication at the open end with the cup member below the level of the liquid therein, a cylindrical member of less diameter than and defining with the side wall of the cup member a passage through which air is conducted into the cleaner toward the surface of the liquid in the cup member exterior of the bell, a tube connected in communication at one end with the bell above the liquid therein and having slots circumferentially spaced about the same opening to a region in the cleaner in which the pressure becomes increasingly less relative to the pressure on the liquid in the cup member exterior of the bell as the rate of flow of the air through the cleaner increases, and a plug slidably mounted in said tube to variably uncover the tube slots to said region and cause the liquid in the bell to be subjected to different pressures predeterminedly higher than the pressures in said region and proportionally less than the pressure to which the liquid in the cup member exterior of the bell is subjected and raise the level of the liquid in the bell and lower the level of the liquid in the cup member exterior of the bell proportional to the pressures to which the liquid in the bell is subjected.

2. In a cleaner for air and other gases, a cup like member constituting a liquid reservoir, a bell of less diameter than and communicating at the open end with the cup member below the level of the liquid therein, a hood superposed to the open end of the cup member arranged with a cylindrical member of a diameter greater than the diameter of the bell defining with the side wall of the cup member a passage for conducting air into the cleaner toward the surface of the liquid in the cup member exterior of the bell, an annular primary filtering member bridging the space between said cylindrical member and the bell, a secondary filtering member supported in the open end of the cylindrical member providing a chamber between the filtering members separated from the hood in which the pressure becomes increasingly less relative to the pressure on the liquid in the cup member in front of the primary filtering member exterior of the bell as the rate of flow of the air through the cleaner increases, and means for regulatably connecting the bell above the liquid therein with the chamber between the filtering members and causing the liquid in the bell to be subjected to different pressures predeterminedly higher than the pressure in said chamber and proportionally less than the pressures to which the liquid in the cup member is subjected and thereby displacing liquid from the cup member into the bell and lowering the liquid level in the cup member exterior of the bell.

3. In a cleaner for air and other gases, a cup like member constituting a liquid reservoir, a bell of less diameter than and communicating at the open end with the cup member below the level of the liquid therein, a hood superposed to the open end of the cup member arranged with a cylindrical member of a diameter greater than the bell defining with the side wall of the cup member a passage for conducting air into the cleaner toward the surface of the liquid in the cup member exterior of the bell, an annular primary filtering member bridging the space between said cylindrical member and the bell, a secondary filtering member supported in the upper end of the cylindrical member and arranging a chamber in the cleaner between the filtering members separated from the hood by the secondary filtering member and in which chamber the pressure becomes increasingly less relative to the pressure on the liquid in the cup member exterior of the bell as the rate of flow of the air through the cleaner increases, a tube extended through the secondary filtering member having a restricted opening at one end connected in communication with the bell above the liquid therein and having slots circumferentially spaced about the portion engaging in the secondary filtering member, and a member adjustable longitudinally in said tube adapted to vary the area of the slots to regulatably connect the bell above the liquid therein in the line of flow of the air through said secondary filtering member and subject the liquid in the bell to different pressures predeterminedly higher than the pressure in said chamber and proportionally less than the pressures to which the liquid in the cup member in front of the primary filtering member exterior of the bell is subjected and effect a raising of the liquid in the bell and lowering of the liquid level in the cup member exterior of the bell proportional to the pressures to which the liquid in the bell is subjected in the operation of the cleaner.

WILLY NEUMANN.